Oct. 5, 1965   H. L. SHATTO, JR   3,210,661
PHASE COMPARATOR CIRCUIT
Filed April 15, 1963

INVENTOR:
HOWARD L. SHATTO JR.
BY:
HIS ATTORNEY 3,210,661
PHASE COMPARATOR CIRCUIT
Howard L. Shatto, Jr., Palos Verdes, Calif., assignor to Shell Oil Company, New York, N.Y., a corporation of Delaware
Filed Apr. 15, 1963, Ser. No. 273,132
7 Claims. (Cl. 324—83)

The present invention relates to a circuit for measuring the phase angle between a pair of equi-period alternating voltage signals. More particularly the invention relates to an apparatus for comparing the phase relationship between two signals, a first of which is used as a reference signal, to produce an output indicating whether the second signal leads or lags the first signal.

The apparatus of this invention has particular use in a positioning control servo system wherein one of the signals is a command signal which has been shifted in phase in accordance with the position to be assumed by the particular apparatus being controlled and the second signal indicates the present position of the controlled apparatus. The phase relationship of the two signals is then compared by the circuit forming the subject matter of this invention to produce a control signal which is applied to positioning equipment for bringing the two signals into coincidence. Such a system is shown in the copending application of Robert H. Kolb and Howard L. Shatto, Jr., Serial No. 133,119, filed August 22, 1961, now U.S. Patent No. 3,145,683, issued August 25, 1964.

It is accordingly a primary object of this invention to produce a novel circuit for measuring the phase angle between two signals.

It is a further object to provide a phase measuring circuit which is uneffected by unequal amplitudes in the two signals.

Briefly the above objects are achieved by sampling one of the alternating signals when the second signal is at the mid-point of its voltage cycle with the voltage decreasing. This is accomplished by applying the first signal to a capacitor during the positive half cycle of the second signal and then determining the voltage across the capacitor during the negative half cycle of the second signal.

The objects and advantages of this invention will be more easily understood from the following detailed description when taken in conjunction with the attached drawings, wherein.

Figure 1:
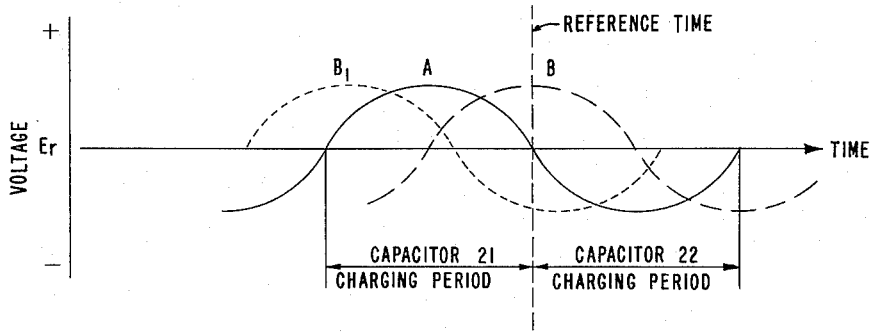
FIGURE 1 illustrates the possible phase relationships between the reference or command signal and the position signal.

Referring to FIGURE 1 of the drawing wherein are shown the command signal A and the two possible phase relationships of the position signal B, i.e., the position signal either leads or lags the command signal. The time for comparison is taken as that time when the signal A is at zero and decreasing with respect to the reference voltage $E_R$. As can easily be seen in FIGURE 1, in the event that the signal B leads signal A, the voltage of signal B has a positive polarity at the instant signal A is equal to zero and decreasing. If signal B lags signal A, then at the instant signal A is zero and decreasing, signal B will be negative. Since the two signals, A and B, are equi-period sinusoids, it is obvious that the sampled output polarity of signal B is a direct indication of the phase relationship between the signals. The polarity of the sampled value of signal B therefore can be used to adjust the phase of signal B to bring it into coincidence with signal A.

Figure 2:
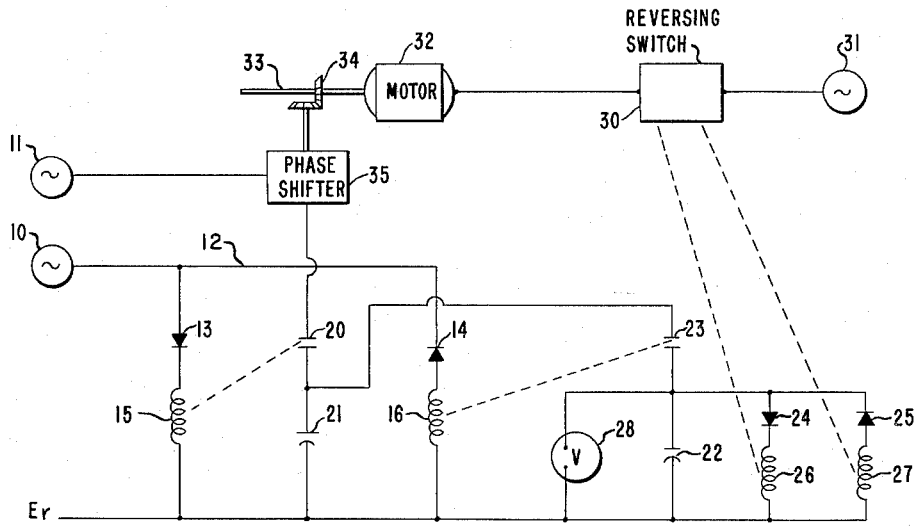
FIGURE 2 is a schematic diagram of the phase measuring circuit embodying the present invention.

Referring now to FIGURE 2, there is shown two alternating input signals A and B supplied by sources 10 and 11 respectively. The signal A is applied by means of lead 12 to a pair of oppositely poled rectifiers 13 and 14 which are connected through relay coils 15 and 16, respectively, to a point of reference potential $E_R$ which is preferably ground.

The signal B is applied through a pair of normally open relay contacts 20, which are controlled by relay coil 15, across a large storage capacitor 21. Connected across storage capacitor 21 through a pair of normally open contacts 23 which are controlled by relay coil 16, are three parallel circuit branches. The first of these branches contains a small capacitor 22 and the remaining two branches consist of a pair of oppositely poled rectifiers 24, 25 in series with relay coils 26 and 27, respectively. The relay coils 26 and 27 comprise the normal output devices of the phase comparator circuit and the particular one energized indicates whether signal B is leading or lagging signal A.

A zero centering voltmeter 28 may also be connected across the capacitor 22 for directly observing the voltage stored by capacitor 22. In the situation where the phase angle between the two input signals is less than 90°, the meter 28 will indicate a value directly related to the phase of signal B.

Referring now to FIGURES 1 and 2 and assuming that signal B leads signal A, the operation of the phase comparator is as follows: As signal A becomes positive with respect to the reference voltage $E_R$, the rectifier 13 begins to conduct, thereby energizing relay coil 15 and closing contacts 20. Closure of contacts 20 allows the voltage of signal B to be impressed across capacitor 21 causing capacitor 21 to charge to the instantaneous value of signal B. As long as the voltage of signal A remains positive, the voltage of signal B is impressed across capacitor 21. At the instant that the voltage of signal A is zero, the rectifier 13 ceases to conduct; thus de-energizing the relay coil 15 and opening the contacts 20. The opening of contacts 20 removes the voltage of signal B from capacitor 21 which then remains charged to a value of voltage equal to the instantaneuos value of signal B at the time signal A was equal to zero. In the instant example, the voltage across the capacitor 21 is positive with respect to the reference voltage $E_R$.

As the voltage of signal A becomes negative, the rectifier 14 begins to conduct, thereby energizing relay coil 16 and closing contacts 23. Closure of contacts 23 permits capacitor 21 to simultaneously charge the capacitor 22 and discharge through the load of the circuit, which, in the preferred embodiment, is the two parallel branches containing the relay coils 26 and 27 respectively. In the instant case, since the voltage across capacitor 21 has a positive polarity, the rectifier 24 begins to conduct, thereby energizing relay coil 26 which may be used to control any suitable output device for indicating that signal B is leading signal A. It is noted that although the voltage of signal B is examined instantaneously, it is transmitted to the circuit load over the negative half period of signal A by the discharge of capacitor 21. Capacitor 22, which is a small capacitor relative to capacitor 21, insures that sufficient voltage is present to maintain the operation of relay coils 26 and 27 during the half cycle that contacts 23 are closed.

As previously stated, the phase comparator circuit just described has particular application in a position control servo system. When the circuit is incorporated in such a system, the relay coils 26 and 27 are used to control the operation of a reversing switch 30 whose function it is to connect the source 31 to the reversible motor 32 in such a way as to cause the motor 32 to rotate in a forward or a reverse direction depending upon which of the relay coils 26 or 27 is energized, all as well known in the servo system art. Any rotation of the output shaft 33 by the motor 32 is transmitted by means of mechanical coupling 34 to a phase shifting device 35 which is connected in series with source 11.

In the operation of the above described servo system, the signal A corresponds to a command signal and the signal B corresponds to the position indicating signal. The two signals are compared in the phase comparator circuit and if they do not coincide in phase, one of the relay coils 26, 27 is energized. Assuming again that signal B leads signal A, the relay coil 26 is energized as previously described, and will be energized on alternate half cycles of signal A as long as the signal B continues to lead signal A. Energization of relay coil 26, however, causes switch 30 to connect source 31 to motor 32 in a manner to cause the motor to rotate in a reverse or clockwise direction resulting in phase shifting device 35 shifting the phase of the signal from source 11 to bring it into phase with the command signal. When the two signals are in phase coincidence, the relay coil 27 is de-energized, resulting in the source 31 being disconnected from the motor 32 and the system coming to rest.

Although the phase comparator circuit has been described using mechanical relays, it is obvious that such relays due to their inherent switching times will only allow the circuit to operate satisfactorily if relatively low frequency alternating input signals are used. It is therefore understood that in the event that relatively high frequency input signals are used, the mechanical relays may be replaced by electronic relays such as transistors or vacuum tubes.

I claim as my invention:

1. Apparatus comparing the phase angle between two equi-period alternating signals comprising:
    (a) a pair of signal sources for producing first and second equi-period alternating electric signals;
    (b) a storage capacitor;
    (c) gating means responsive to a first of said signals for connecting the second of said signals across said storage capacitor whenever said first signal is of a first polarity and for disconnecting said second signal from said capacitor whenever said first signal changes to a second polarity;
    (d) polarity sensitive electrical indicating means; and
    (e) means responsive to said first signal for connecting said storage capacitor across the input terminals of said polarity sensitive indicating means whenever said first signal is of said second polarity, whereby the polarity of the voltage across said capacitor denotes the phase relationship between said first and second signals.

2. Apparatus for comparing the phase angle between two equi-period alternating signals comprising:
    (a) a first source of alternating signal;
    (b) a first polarity sensitive relay means connected in series with said first source of alternating signal;
    (c) a second polarity sensitive relay means connected in parallel with said first polarity sensitive relay means, each of said polarity sensitive relay means being responsive to a different polarity of said first alternating signal;
    (d) a second source of alternating signal;
    (e) a storage capacitor;
    (f) means controlled by said first polarity sensitive relay means for connecting said second source of alternating signal to said storage capacitor;
    (g) polarity sensitive indicating means; and
    (h) means controlled by said second polarity sensitive relay means for connecting the voltage across said capacitor to said polarity sensitive indicating means.

3. Apparatus as in claim 2 wherein each of said polarity sensitive relay means comprises a relay coil in series with a rectifier and wherein each of said means controlled by said polarity sensitive relay means comprises a pair of normally open relay contacts.

4. Apparatus as in claim 2 wherein said polarity sensitive indicating means comprises an electric circuit containing three parallel branches, one of said branches containing a small capacitor and each of the other branches containing a relay coil in series with a rectifier, said rectifiers being oppositely poled.

5. Apparatus as in claim 3 wherein said polarity sensitive indicating means comprising an electric circuit containing three parallel branches, one of said branches containing a small capacitor and each of the other branches containing a relay coil in series with a rectifier, said rectifiers being oppositely poled.

6. Apparatus as in claim 4 including a reversible motor; means responsive to said polarity sensitive indicating means for causing said motor to rotate in a direction dependent upon which of said last mentioned relay coils is energized; and means responsive to the rotation of said motor for shifting the phase of said second signal.

7. Apparatus as in claim 5 including a reversible motor; means responsive to said polarity sensitive indicating means for causing said motor to rotate in a direction dependent upon which of said last mentioned relays is energized; and means responsive to the rotation of said motor for shifting the phase of said second signal.

References Cited by the Examiner

UNITED STATES PATENTS 2,713,135  7/55  Macklem _____ 324—111

WALTER L. CARLSON, *Primary Examiner.*

UNITED STATES PATENT OFFICE
CERTIFICATE OF CORRECTION

Patent No. 3,210,661　　　　　　　　　　　　　　　October 5, 1965

Howard L. Shatto, Jr.

It is hereby certified that error appears in the above numbered patent requiring correction and that the said Letters Patent should read as corrected below.

Column 1, line 60, for "leads" read -- lags --; line 62, for "lags" read -- leads --; same line 62, after "A," insert -- i.e., signal B1, --; column 2, line 27, for "leads" read -- lags --; line 57, for "leading" read -- lagging --; column 3, line 12, for "leads" read -- lags --; line 15, for "lead" read -- lag --; same column 3, line 21, for "27" read -- 26 --.

Signed and sealed this 7th day of February 1967.

(SEAL)
Attest:

ERNEST W. SWIDER　　　　　　　　　　　　　　　EDWARD J. BRENNER
Attesting Officer　　　　　　　　　　　　　　　　Commissioner of Patents